Feb. 15, 1927.

W. E. BUTLER 1,617,895

COMBINED THROTTLE AND TRIP VALVE

Filed April 19, 1922

Inventor.
William E. Butler
by J. A. McCrady
his atty.

Feb. 15, 1927.

W. E. BUTLER 1,617,895

COMBINED THROTTLE AND TRIP VALVE

Filed April 19, 1922 4 Sheets-Sheet 4

Inventor.
William E. Butler
by J. H. McCrady
his Atty.

Patented Feb. 15, 1927.

1,617,895

UNITED STATES PATENT OFFICE.

WILLIAM ELLSWORTH BUTLER, OF NEWBURYPORT, MASSACHUSETTS.

COMBINED THROTTLE AND TRIP VALVE.

Application filed April 19, 1922. Serial No. 555,562.

This invention relates to valves of the character employed to control the flow of steam to recirprocating engines, steam turbines, and the like, and more particularly to valves used for stopping engines or turbines suddenly under emergency conditions, as for example, when the speed of the engine or turbine becomes abnormally high.

It is the chief object of the present invention to devise a valve of this character which will be very reliable in operation, can be manufactured economically, shall be suited to installation under a great variety of conditions, and which generally will satisfy the practical requirements of an apparatus of this character. The invention also aims to devise a valve mechanism which can be used satisfactorily for starting and stopping the engine under normal conditions, as well as under emergency conditions.

The nature of the invention will be readily understood from the following description when read in connection with the accompanying drawings, and the novel features will be particularly pointed out in the appended claims.

Figure 1:
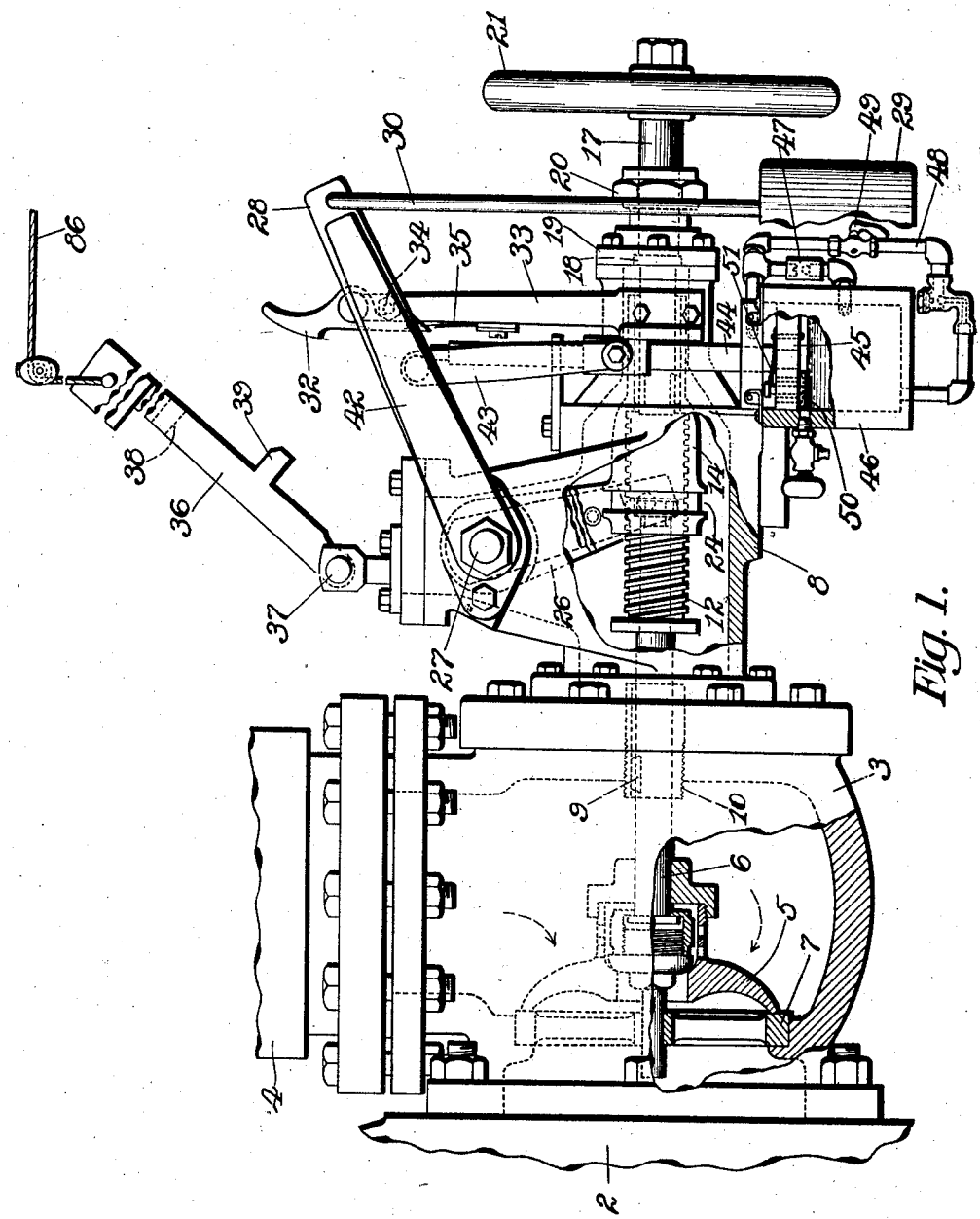
Figure 1 is a view, partly in side elevation and partly in cross section, of a valve constructed in accordance with the present invention.

Referring first to Fig. 1, 2 designates a portion of the steam chest of a steam engine, turbine or the like, 3 a valve casing bolted to the steam chest 2, and 4 the end of a steam line which conducts steam to the valve. Within the casing 3 is a valve 5 having a valve stem 6 connected thereto in the usual manner so that the valve can have a limited movement relatively to the stem but is compelled to move therewih toward and from a valve seat 7. These parts constitute a typical throttle valve arrangement for a steam engine.

Figure 2:
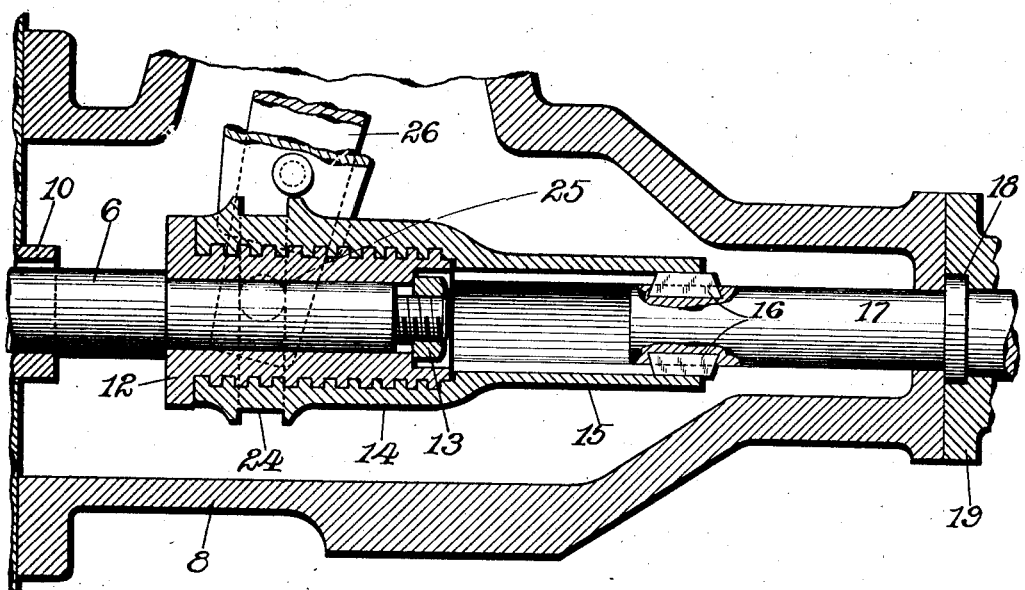
Fig. 2 is a cross sectional view of a portion of the operating mechanism for the valve shown in Fig. 1.

The valve stem 6 projects through the wall of the casing 3 into another casing or housing 8, Figs. 1 and 2, which is bolted to the casing 3, and the stem is held against rotation by means of a key 9 seated therein and projecting into a groove formed in a bushing 10 which is secured in the adjoining walls of the two casings 3 and 8. A threaded sleeve 12 is secured on the end portion of the stem 6 by means of a nut 13 which forces the sleeve against a shoulder on the stem so that this sleeve forms, in effect, a continuation of the stem. The threads of the part 12 engage with the internal threads of a nut 14 having a shank 15 which is grooved to receive two keys or splines 16—16. These keys are seated in a shaft 17 which is co-axial with the parts 6, 12 and 14, and projects through the end of the casing 8. The shaft 17 carries a collar 18 which cooperates with a bracket 19 secured to the casing 8 to hold the shaft against axial movement but permits it to be rotated. A stuffing box 20 encircles the shaft 17 where it emerges from the bracket 19, and a hand-wheel 21 is secured to the end thereof and provides a convenient means for rotating the shaft.

The nut 14 has a peripheral groove 24 formed therein to receive pins or rolls 25 which are carried by a forked or bifurcated arm 26 that straddles the nut and is secured fast on a rock shaft 27 located above the valve stem and extending transversely thereto. Another arm 28 is secured fast to this rock shaft outside the casing 8, and with the arm 26 forms, in effect, a bell crank lever. A weight 29 connected to the arm 28 by a link 30 tends, through its connections with the valve, to hold the valve in its closed position as will be obvious from an inspection of Fig. 1. Normally this movement of the valve is restrained by a latch 32 which is pivoted on the upper end of a standard 33 and has a hook to engage a pin 34 projecting laterally from the arm 28. A leaf spring 35 acts on the latch 32 to hold it in its latching position. For the purpose of releasing the latch 32 a weighted lever 36 is fulcrumed on the top of the casing 8 at 37 and carries a lug 38 which is adapted to strike the upper curved face of the latch 32 and swing it on its pivot in a direction to release the pin 34. Normally the lever 36 is held in its uppermost position by a controlling or governing mechanism later to be described, but when it is released and allowed to drop, it operates first to release the latch 32, as just described, and its movement is then stopped by the engagement of a lug 39 on the lever with the top of the casing 8.

When the valve 5 is in its open position the part 12 is substantially enclosed in the nut 14, as shown in Fig. 2, and the instant that the latch 32 releases the pin 34 the weight 29 operates through its connections with the nut 14 to slide the valve toward its seat 7, all the parts 5, 6, 12 and 14 sliding forward as a unit. The flow of steam through the valve tends to slam this valve against its seat, and in order to reduce the rate of the valve closing movement a dash pot mechanism is connected with the valve stem. This mechanism comprises an arm 42 fast on the shaft 27 and connected by a link 43 with a rod 44 which is guided for vertical movement. A piston 45 is secured to the lower end of this rod and works in a cylinder or dash pot 46 containing oil or other suitable fluid. When the latch 32 is released and the valve 5 starts to close, the piston 45 is forced downwardly, and the liquid below the piston flows through two by-passes 47 and 48 into the upper part of the cylinder above the piston. The rate of flow of the liquid through the by-pass 48 is controlled by adjusting a valve 49 which is included in this by-pass. With this arrangement, therefore, the rate of the closing movement of the valve can be controlled as desired. During the latter part of this movement the oil escapes through the by-pass 48 only, so that by adjusting the valve 49 the valve 5 may be caused to seat very gently. Upon the upward movement of the piston 45, which occurs during the resetting of the apparatus, the oil flows through holes formed in the piston 45, these holes being closed during the reverse movement by a valve 50 which normally is held in its closed position by a light spring 5.

Immediately after the valve 5 has been closed, the valve stem, and the parts immediately connected therewith, are in the positions shown in Fig. 2. In order to reset the mechanism and open the valve, the lever 36 is first raised and the hand-wheel 21 next is rotated to the left, thus turning the nut 14 backwardly, the part 12 remaining stationary. This movement automatically results in returning the levers 28 and 42 to their initial positions, as shown in Fig. 1, and re-engages the pin 34 with the latch 32. When this movement has been completed the parts are in the position shown in Fig. 1. By then reversing the movement of the hand-wheel 21 the threaded member 12 will be drawn backwardly within the nut 14, thus opening the valve 5 and admitting steam to the engine. When the flange on the part 12 strikes the end of the nut 14 the opening movement of the valve is stopped, the parts at this time being in the running or operative position where they will remain until the latch 32 is tripped again, or the valve is closed by operating the hand-wheel 21.

Figure 3:
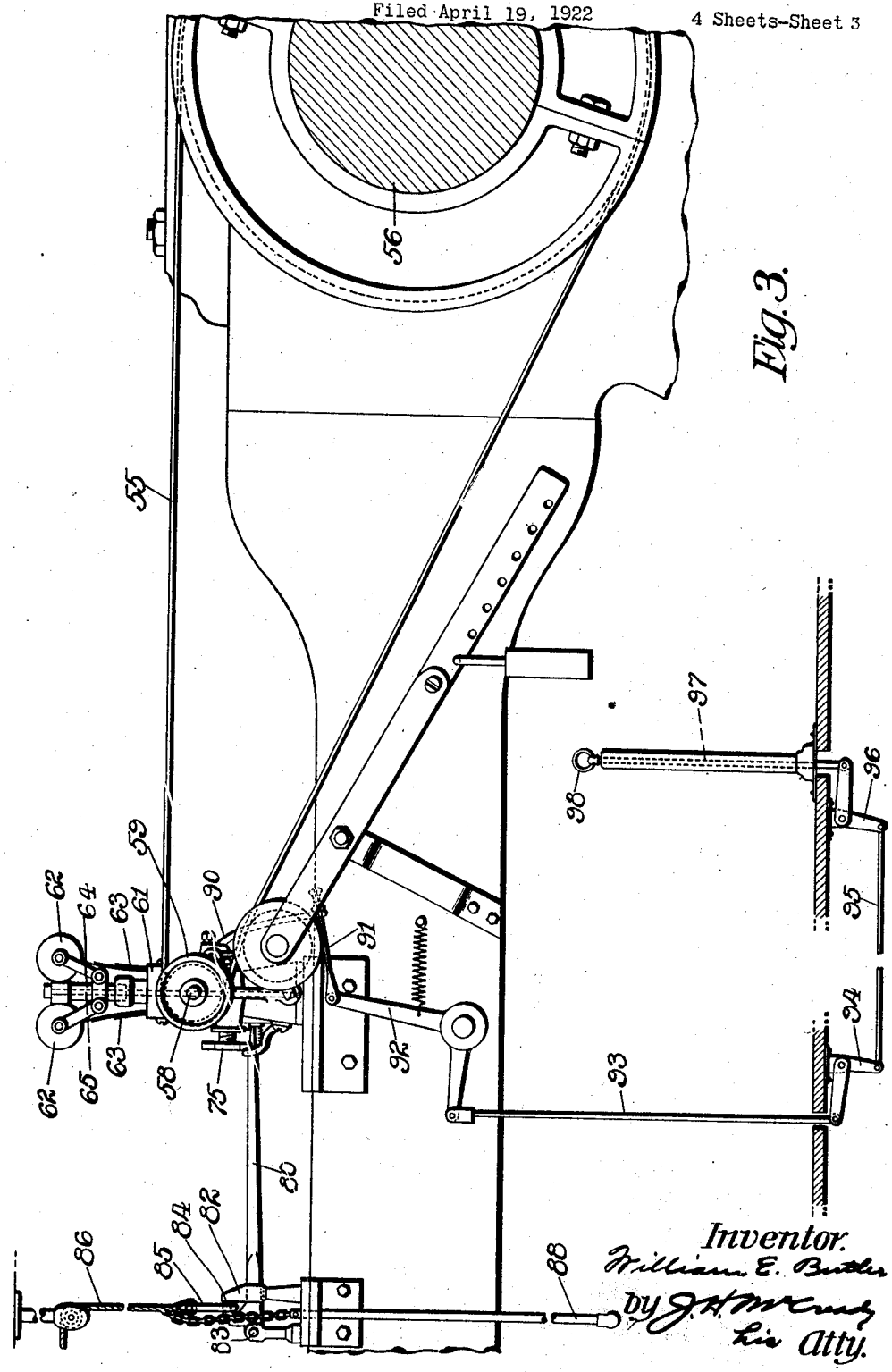
Fig. 3 is a view, partly in side elevation and partly in cross section, of the controlling mechanism for the valve.
Figure 4:
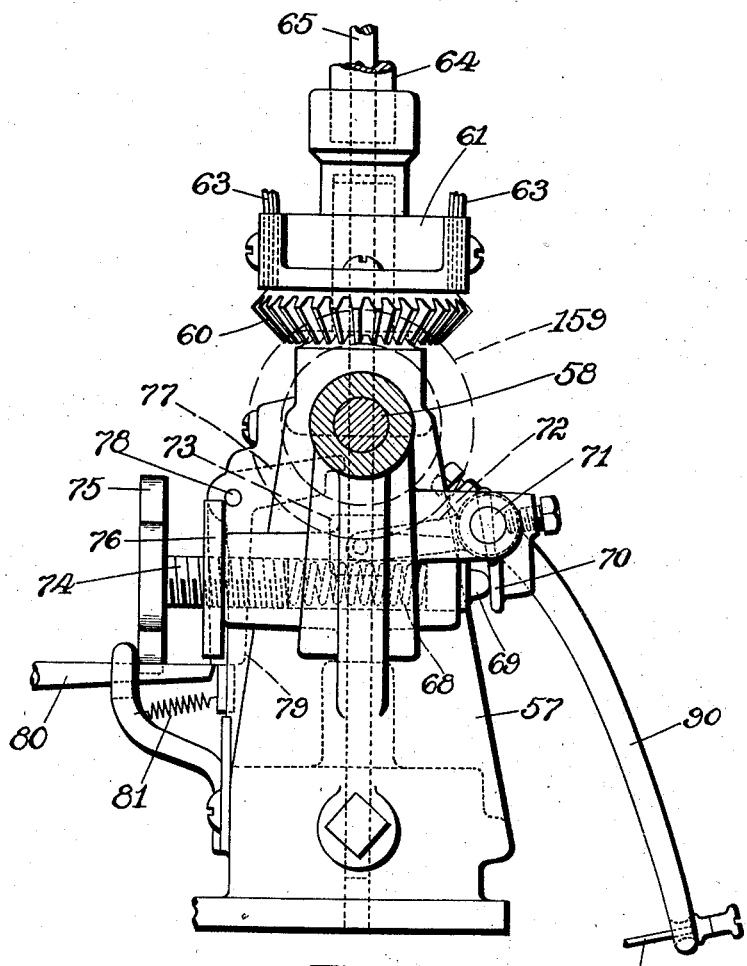
Fig. 4 is a side elevation of a part of the controlling mechanism shown in Fig. 3.

The controlling apparatus for the mechanism above described is best illustrated in Figs. 3 and 4, and comprises a governor mechanism mounted in any convenient location and preferably driven through a belt connection 55 with the main shaft 56 of the engine. This governor mechanism comprises a bracket 57 supporting a shaft 58 having a pulley 59 thereon to receive the belt 55. This shaft also carries a bevel gear 159 driving another bevel gear 60 having a bracket 61 secured thereto and mounted to rotate about a vertical axis. This bracket has two sets of leaf springs 63—63 secured thereto, the master leaf of each set supporting at its upper end a governor ball 62. These balls are connected by links to a sleeve 64 which is mounted in the bracket 61 and encircles a rod 65 that projects through the entire length of the sleeve and is provided at its upper end with a head overlying the end of the sleeve. When the balls 62—62 are thrown outwardly by centrifugal inertia upon an increase in their speed of rotation, they will lift the sleeve 64 and with it the rod 65. This lifting movement is yieldingly opposed by a spring 68, Fig. 4, bearing against a block 69 that presses against an arm 70 secured fast in a rock shaft 71. The rock shaft has another arm 72 secured thereto which is pivoted to a collar 73 secured fast on the rod. The spring 68 is backed up by an adjusting screw 74 provided with a hand-wheel 75 and a check nut 76 holds the screw in its adjusted position. When the collar 73 rises far enough, it strikes the inner end of one arm 77 of a bell crank lever pivoted at 78 and having another arm 79 which normally overlies the end of an arm 80, Figs. 3 and 4. A light spring 81 tends to hold the lever 79 in the position shown in Fig. 4. The arm 80 projects through an opening between the members of a forked bracket 82 and is fulcrumed at 83. Formed on this arm is a hook 84 which normally engages a link 85 on the end of a cord, chain, or the like, 86, which is guided over suitable pulleys and runs to the free end of the weighted lever 36, Fig. 1.

This mechanism, therefore, normally holds the lever 36 in its elevated position. When, however, the speed of rotation of the main shaft 56 increases above a predetermined point, the rod 65 will be lifted through the action of the governor balls, as above described, thus causing the collar 73 to swing the bell crank lever 77—79 in a counter-clockwise direction, Fig. 4, far enough to release the end of the arm 80, whereupon this arm will swing upwardly releasing the link 85 and thereby allowing the weighted lever 36 to drop. This will trip the latch 32 and allow the valve to close in the manner previously described.

When it is desired to reset the mechanism, the arm 80 is swung back into its horizontal position, as shown in Fig. 3, the link 85 first being engaged with the hook 84. The arm will be held in this position by the latch or lever 79 until tripped again by hand or by an abnormal speed condition. In order to facilitate the engagement of the link 85 with the hook 84, in case the connections run overhead, a handle 88 is connected to the cord 86, as shown in Fig. 3.

In many installations it is desirable to provide an additional control through which the valve can be tripped manually from a distant point. This condition is provided for conveniently in the arrangement shown by securing an arm 90 to the rock shaft 71 of the governor mechanism, connecting this arm through a link 91, bell crank lever 92, link 93, lever 94, link 95, and lever 96 to a rod 97 having a handle 98. By pulling the handle 98 the rock shaft 71 will be moved in a direction to cause the collar 73 to trip the latch or lever 79, thus releasing the arm 80 and causing the valve to close in the manner above described.

It will now be appreciated that this invention provides a simple form of mechanism which will operate automatically to close the valve and shut down the engine or turbine controlled thereby under abnormal speed conditions. The parts of the mechanism are rugged and substantial and it is, therefore, not liable to get out of order. A particular advantage of combining this mechanism with the throttle valve of an engine is that the apparatus must be operated at least twice a day under normal conditions so that it does not have an opportunity to get out of order without that fact being known at once. It therefore avoids the serious objection to most safety mechanisms, that they are not subjected to frequent usage or inspection, and when an emergency happens the safety apparatus fails to function because it has in the meantime become deffective in some manner without such defect being known. A further advantage of this mechanism is that it does not require the breaking of the steam line to install, the installation being made directly at the throttle valve. The valve cannot be opened without setting the safety apparatus, so that it is impossible to start up the engine wihout having the safety mechanism in condition to operate.

While I have herein shown and described the best embodiment of my invention of which I am at present aware, it will readily be appreciated that this embodiment may be modified in many particulars without departing from the spirit or scope of this invention. In fact, the details of construction necessarily will be controlled in some particulars by the conditions under which the installation is made.

Having thus described my invention, what I desire to claim as new is:

1. An apparatus of the character described comprising, in combination, a valve, a casing therefor, a screw threaded stem for said valve held against rotation, a nut engaging the threaded portion of said stem, a hand-wheel connected with said nut to rotate the nut, a weighted lever connected with said nut to control the longitudinal movement of the nut, and a latch for holding said lever in a given position.

2. An apparatus of the character described comprising, in combination, a valve, a casing therefor, a screw threaded stem for said valve held against rotation, a nut engaging the threaded portion of said stem, a hand-wheel connected with said nut to rotate the nut, a latch, connections between said latch and nut for holding the valve normally in its open position, means for releasing said latch, a dash pot having a piston therein, and connections between said valve stem and said dash pot enabling said dash pot to reduce the rate of the closing movement of said valve.

3. An apparatus of the character described comprising, in combination, a valve, a casing therefor, a screw threaded stem for said valve held against rotation, a nut engaging the threaded portion of said stem, a shaft having a splined connection with said nut, a hand-wheel on said shaft, means for holding said shaft against axial movement, said nut having a groove in its peripheral surface, a bell crank lever having parts to engage said groove to control the longitudinal position of the nut, a weight connected with said lever and tending to move the lever to close the valve, and a latch for restraining said movement of the lever.

4. An apparatus of the character described comprising, in combination, a valve, a casing therefor, a slidable stem connected with said valve for operating it, an externally threaded sleeve secured on said stem, an internally threaded nut engaging the threads of said sleeve, a shaft having a splined connection with said nut, a hand wheel on said shaft, means for holding said shaft against axial movement, and a latch mechanism connected with said nut for holding the valve normally in its open position.

WILLIAM ELLSWORTH BUTLER.